United States Patent [19]

Iemura et al.

[11] Patent Number: 4,821,887

[45] Date of Patent: Apr. 18, 1989

[54] ROTATABLE STOCK CLOSET

[75] Inventors: Takusuke Iemura; Takeshi Gotoh; Hiroshi Komaki, all of Yokohama, Japan

[73] Assignee: Okamura Corporation, Japan

[21] Appl. No.: 350,640

[22] Filed: Feb. 22, 1982

Related U.S. Application Data

[63] Continuation-in-part of Ser. No. 203,449, Nov. 3, 1980, Pat. No. 4,379,602.

[30] Foreign Application Priority Data

Aug. 11, 1981 [JP] Japan ............................ 56-118289[U]

[51] Int. Cl.⁴ ............................................. A47F 3/08
[52] U.S. Cl. .................................... 211/1.5; 211/122; 312/97; 312/134; 312/268
[58] Field of Search .................... 211/1.5, 121, 122; 198/472, 648, 799; 414/331; 312/91, 97, 268, 132, 135, 134; 248/298

[56] References Cited

U.S. PATENT DOCUMENTS

| 751,681 | 2/1904 | Philippi | 211/122 X |
|---|---|---|---|
| 3,298,536 | 1/1967 | Zippel | 211/121 |
| 3,596,397 | 8/1971 | Colletti | 46/257 |
| 3,780,852 | 12/1973 | Weiss et al. | 211/122 |
| 3,885,471 | 5/1975 | Morine et al. | 474/144 |
| 4,144,687 | 3/1979 | Brunes | 198/860 |
| 4,379,602 | 4/1983 | Iemura et al. | 312/97 X |

FOREIGN PATENT DOCUMENTS

| 1013075 | 8/1964 | United Kingdom. | |
| 2061860 | 5/1981 | United Kingdom | 312/97 |

*Primary Examiner*—Ramon S. Britts
*Assistant Examiner*—David L. Talbott
*Attorney, Agent, or Firm*—Ostrolenk, Faber, Gerb & Soffen

[57] ABSTRACT

A rotatable stock closet for the storage of articles such as electronic parts, and the like, including a plurality of container conveying units arranged vertically one above another on a frame. Each unit includes outer and inner rails with guide channels arranged in parallel therebetween. Each unit also includes an endless traction chain and a motor driving the chain. A series of stock containers, releasably connected to the traction chain of each unit, move on and along the rails, so that any container may be quickly and easily reached by an operator by selectively operating the motor of the appropriate container conveying unit. With the traction chains and containers removed, the frame and the container conveying units can be disassembled horizontally into a drive end unit, a series of intermediate units and an idler end unit. When the traction chains are mounted, the tension of each traction chain is adjustable.

11 Claims, 4 Drawing Sheets

ROTATABLE STOCK CLOSET

This application is a continuation-in-part of U.S. patent application Ser. No. 203,449, filed Nov. 3, 1980, and issued as U.S. Pat. No. 4,379,602 on Apr. 12, 1983.

BACKGROUND OF THE INVENTION

1. Field of the Invention

The present invention relates generally to an article stock closet, and more particularly to an improvement in a rotatable stock closet including a plurality of open containers for the storage of articles such as electronic parts or similar articles, movable arranged in a plurality of container conveying units arranged vertically one on another.

2. Description of the Prior Art

After extended use of a stock closet of the type described above, the joints or connected point of an endless pull or traction chain inevitably become longer. This may interfere with smooth operation of the chain along guide tracks or rails, and may eventually cause such trouble that the containers run off their tracks.

To solve this problem, two shafts for chain driving sprockets are ordinarily provided. The distance between the axes of the shafts is outwardly adjustable to the extent necessary to absorb slack due to wear of the chain. At the same time, the guide rails have split parts near one or both ends of the straight sections of the rails. The ends of the straight sections adjoin curved sections of the rails so that the split parts may slide away from the ends of the straight sections of the rails to extend the total length of the straight sections by an amount equal to the axial adjustment of the sprocket shaft. This compensates for the slack in the driving chain. Gaps formed between the extended split parts and the ends of the straight sections may be filled with filler plates to form a smooth, continuous connection of the rails. For this purpose, a variety of filler plates having many different sizes are required, to fill the gaps formed by the axial adjustment of the sprocket shafts. Thus, the adjustment is a troublesome job requiring substantial time and labor.

In this device, motors drive the traction chains for the vertically arranged container conveying units. Turning these motors on generally causes very large tension forces on endless driving chains which run between sprockets connecting to the motors and the traction chains. The frame of the rotatable stock closet is thus distorted by the tension forces, especially if many articles are stored in the stock closet. Therefore, the frame must be manufactured strongly enough to prevent such distortion of the frame.

Furthermore, the stock closet is usually large, requiring extensive space for its manufacture. It would be preferable to vary the size of the stock closet depending on the purpose of its use.

SUMMARY OF THE INVENTION

It is an object of the present invention to provide a rotatable stock closet free from the aforementioned disadvantages and inconveniences, with improved manufacture, adjustment, performance and durability compared to the conventional design described above.

it is another object of the present invention to provide a rotatable stock closet in which an axial adjustment of sprocket shafts carrying the traction chain for moving the article containers may be readily performed with less labor and parts.

It is still another object of the present invention to provide a rotatable stock closet enabling highly efficient access to any desired article stored in any container.

Yet another object of the present invention is to provide a rotatable stock closet which does not require as large a space for its manufacture and the size of which can be varied depending on the purpose of its use.

These and other objects of the invention are achieved by providing a rotatable stock closet comprising a plurality of container conveying units arranged vertically one above another on a frame, each container conveying unit comprising (a) an endless loop of outer rail extending in a first horizontal plane, (b) discrete inner rails extending in a second horizontal plane, arranged inside the outer rail at a certain distance away therefrom, (c) discrete guide channels extending in the first horizontal plane, arranged between the inner rails and the outer rail at a certain distance away therefrom, (d) an endless loop of traction chain which is guided by the guide channels and is adapted to be moved along the same, (e) means for driving the traction chain, and (f) a plurality of container means releasably connected to the traction chain so as to be moved on and along the inner rails and the outer rail together with the traction chain. The traction chain together with the connected container means of each container conveying unit are removable, however, so that the frame and the container conveying units mounted on the frame, may be detached into a drive end unit, intermediate units and any idler unit.

In the preferred embodiment, the frame includes a drive end frame, at least one intermediate frame and an idler end frame. The intermediate frames are detachably connected to form an intermediate unit series, which is detachably connected at one end to the drive end frame and at the other end to the idler end frame. The container conveying units are mounted to the frame in a vertical stack, with the rail structure, including outer rail, inner rails and guide channels mounted to the frame. In addition, drive means are mounted in the drive end frame and operate to drive the traction chain and the containers attached to it along the rail structure. Without the traction chain and the containers, however, the rotatable stock closet may be detached into a drive end unit, an idler end unit and at least one intermediate unit.

These and other objects and features of the invention will be understood more fully from the accompanying drawings and the following description.

BRIEF DESCRIPTION OF THE DRAWINGS

In order that the present invention may be better understood, a preferred embodiment of the present invention will be described with reference to the accompanying drawings, in which.

DESCRIPTION OF THE PREFERRED EMBODIMENT

Figure 1:
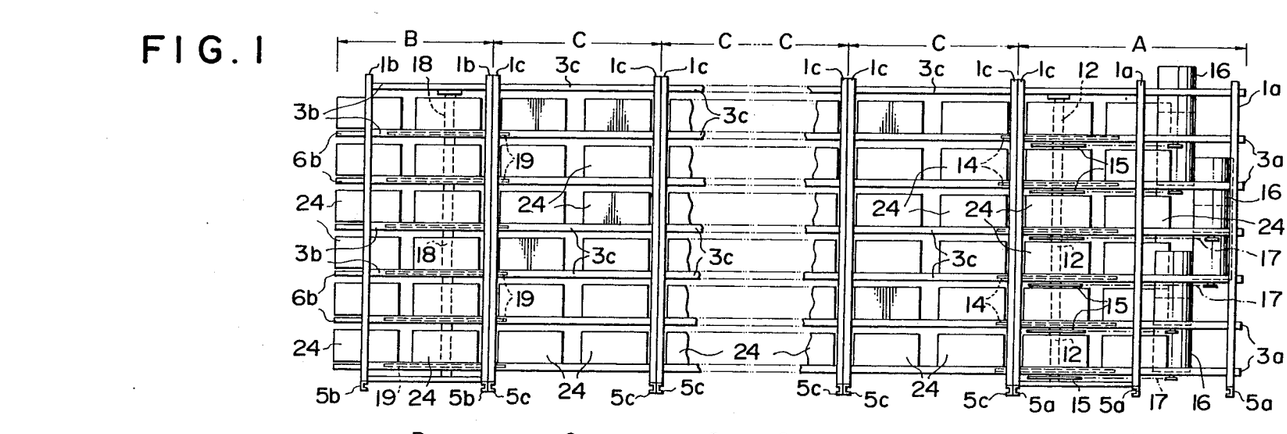
FIG. 1 is an elevational view of a rotatable stock closet according to the present invention.
Figure 2:
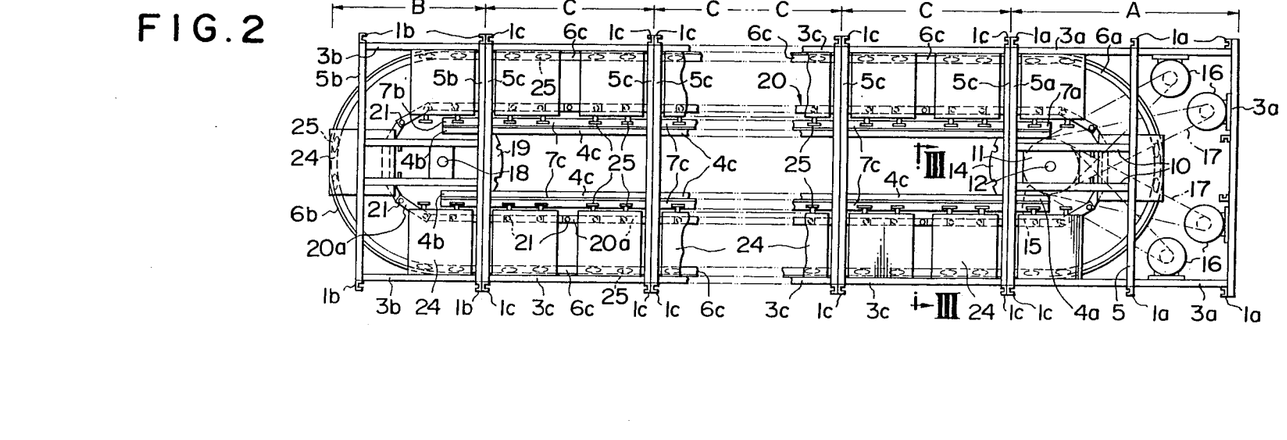
FIG. 2 is a top plan view of the rotatable stock closet shown in FIG. 1.

Referring now to the drawings, FIGS. 1 and 2 show one embodiment of a rotatable stock closet according to the present invention. The rotatable stock closet can be preferably assembled from and disassembled into three kinds of units, i.e. a drive end unit (A), a plurality of intermediate units (C), and an idler end unit (B), which are horizontally connected in series in a conventional manner such as by means of bolts and nuts. The rotatable stock closet also includes traction chains 20 and container means including containers 24 connected to chains 20, described below.

1. Drive End Unit (A)

As shown in FIG. 1, the drive end unit (A) includes a drive end frame having a generally rectangular parallelelpiped shape constructed as follows. A plurality of outer struts 1a stand upright spaced apart equally from one another. Inner struts 2a, shown in FIG. 4, stand upright inside the outer struts 1a and also spaced apart equally from one another. A plurality of outer bridge beams 3a extend horizontally perpendicular to the adjacent outer struts 1a and connect the outer struts 1a, while inner bridge beams 4a, having a shorter length, extend horizontally at a relatively higher level than the outer bridge beams 3a perpendicular to the adjacent inner struts 2a and connect the outer surfaces of the inner struts 2a. Coupling beams 5a extend horizontlaly perpendicular to both the outer and the inner bridge beams 3a and 4a and connect the outer and the inner struts 1 and 2a.

Figure 3:
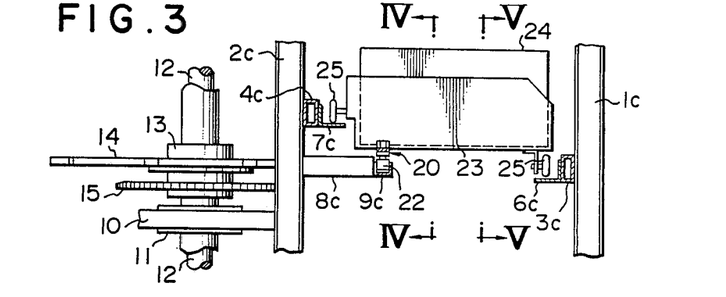
FIG. 3 is a longitudinal cross sectional view of the invention, taken along line III—III of FIG. 2.
Figure 4:
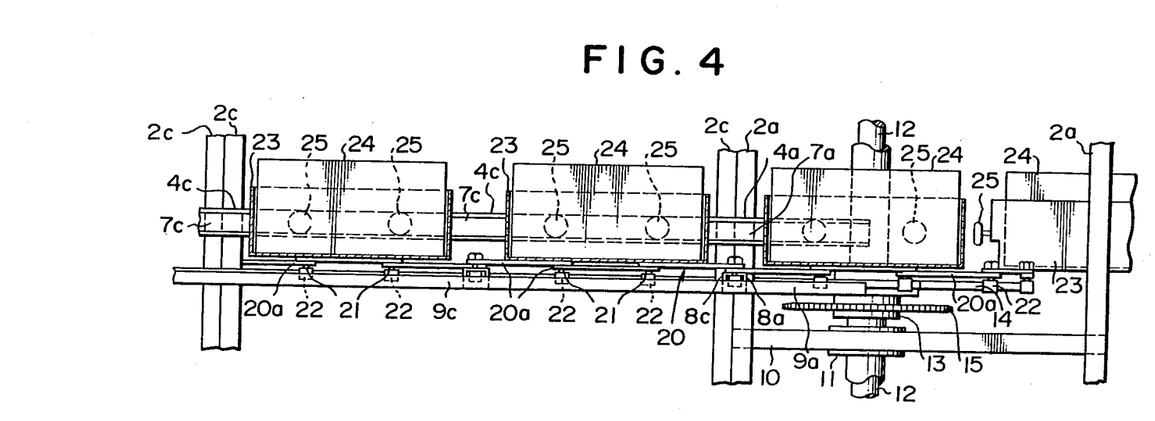
FIG. 4 is a longitudinal cross-sectional view of the invention, taken along line IV—IV of FIG. 3.
Figure 5:
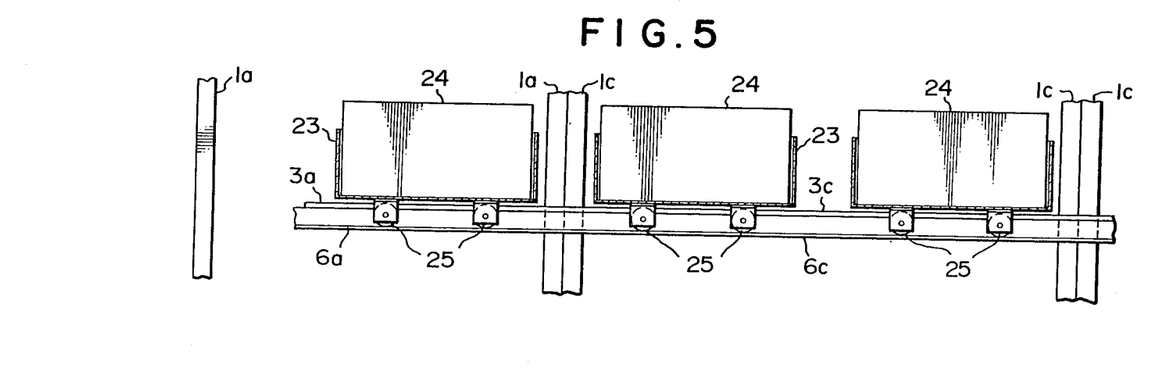
FIG. 5 is a longitudinal cross-sectional view of the invention, taken along line V—V of FIG. 3.

A desired number of outer rails 6a having an L-shaped cross-section are arranged vertically one above another spaced a certain distance apart and secured to the inner surface of each outer bridge beam 3a except the uppermost one. Each outer rail 6a comprises a half-circular part and a pair of short straight parts which extend horizontally parallel to each other and are integrally connected to the ends of the half-circular part. A corresponding number of discrete straight inner rails 7a extend horizontally parallel to the straight parts of the outer rails 6a, and are secured to the outer surfaces of the inner bridge beams 4a. Inner rails 7a are arranged vertically one above another spaced a certain distance apart, yet at relatively higher levels than the corresponding outer rails 6a. As shown in FIG. 4, a plurality of brackets 8a having a short length extend outwards from the inner struts 2a at the same levels as the outer rails 6a. A pair of discrete guide channels 9a having a generally U-shaped cross-section are mounted to the free ends of the brackets 8a and extend between the outer and the inner rails 6a and 7a parallel to and at the same levels as the straight parts of the outer rails 6a, as shown in FIGS. 3-5. Outer rail 6a, inner rails 7a and guide channels 9a provide a continuous track through drive end unit (A) as shown in FIG. 2.

The linking vertical end of the drive end unit (A), shown at its left in FIGS. 1 and 2, is defined by one pair of the outer struts 1a and the coupling beams 5a between them. The leftward ends of the outer and the inner struts 1a and 2a, the coupling beams 5a, the brackets 8a, the outer and the inner bridge beams 3a and 4a, the outer and the inner rails 6a and 7a, and the guide channels 9a are all aligned in the same vertical plane, i.e. the leftward linking vertical end of the drive end unit (A).

As shown in FIGS. 3 and 4, first vertical shaft 12 is held in the center of the half-circular part of the outer rail 6a for each stage by support means 11 which is connected to the frame via a pair of support beams 10 supported by the coupling beams 5a. In the support means 11 of each stage, first vertical shaft 12 is provided with a drive sprocket 14 having a large diameter and a transmission sprocket 15 having a small diameter mounted on a bearing means 13 in the lower part of each stage. Bearing means 13, drive sprocket 14 and transmission sprocket 15 rotate together. To drive the drive sprocket 14, each transmission sprocket 15 is connected to an electric motor 16 or other appropriate driver through a drive sprocket 16a, shown in FIG. 6, mounted to the shaft of the electric motor 16 and an endless chain 17, all of which function as drive means for driving traction chains. The electric motor 16 is mounted to the outer bridge beam 3a, as hereinafter described in detail.

2. Idler End Unit (B)

The idler end unit (B) has the same construction as the drive end unit (A), excluding the drive means, and thus a detailed figure of the idler end unit (B) is omitted.

As shown in FIGS. 1 and 2, the idler end frame of the idler end unit (B) has a generally rectangular parallelepiped shape, as shown in FIGS. 1 and 2. Outer and inner struts 1b and 2b, outer and inner bridge beams 3b and 4b, coupling beams 5b, outer rail 6b and inner rails 7b, brackets 8b, and guide channels 9b correspond to elements 1a, 2a, 3a, 4a, 5a, 6a, 7a 8a and 9a of the drive end unit (A). Similarly, outer rail 6b, inner rails 7b and guide channels 9b provide a continuous track through idler end unit (B), as shown in FIG. 2. A plurality of second vertical shafts 18 and the corresponding number of idler sprockets 19 rotatably mounted thereto correspond to first vertical shafts 12 and drive sprocket 14 of the drive end unit (A).

The linking vertical end of the idler end unit (B), shown at its right in FIGS. 1 and 2, is defined by one pair of the outer struts 1b and the coupling beams 6b between them. The rightward ends of the outer and the inner struts 1b and 2b, the coupling beams 5b, the brackets 8b, the outer and the inner bridge beams 3b and 4b, the outer and the inner rails 6b and 7b, and the guide channels 9b are all aligned in the same vertical plane, i.e. the rightward linking vertical end surface of the idler end unit (B).

3. Intermediate Units (C)

As shown in FIGS. 1 and 2, the invention includes a series of intermediate units (C), connected at one end to drive end unit (A) and at the other end to idler end unit (B). Each intermediate unit (C) has a generally rectangular parallelepiped shape with an intermediate frame constructed of outer and inner struts 1c and 2c, outer and inner bridge beams 3c and 4c, and coupling beams 5c, in the same manner as the drive end unit (A). Pairs of outer and inner rails 6c and 7c extend horizontally and rectilinearly parallel to one another at the same levels as those of the drive end unit (A) and the idler end unit (B), and provide continuous tracks through the series of intermediate units (B), as shown in FIG. 2. Outer and inner rails 6c and 7c are secured to the inner surfaces and the outer surfaces of the outer and the inner bridge beams 3c and 4c, respectively. Pairs of guide channels 9c extend horizontally and rectilinearly parallel to one another at the same levels as those of the drive end unit (A) and the idler end unit (B). Guide channels 9c are secured to the inner struts 3c via brackets 8c of the same construction as brackets 8a of the drive end unit (A), in the same manner as the drive end unit (A) and the idler end unit (B).

At the rightward and the leftward ends of each intermediate unit (C), as shown in FIGS. 1 and 2, outer and inner struts 1c and 2c, coupling beams 5c, brackets 8c, outer and inner bridge beams 3c and 4c, outer and inner rails 6c and 7c, and guide channels 9c are aligned in the right and the left linking vertical end surfaces of the intermediate unit (C).

4. Assembly

Thus, the drive end unit (A), the desired number of intermediate units (C), and the idler end unit (B) are detachably linked together in series, as shown in FIGS. 1 and 2. This is done by connecting the outer and the inner struts 1a, 1b, 1c, 2a and 2c, the outer and the inner bridge beams 3a, 3b, 3c, 4a, 4b and 4c, the coupling beams 5a, 5b and 5c, and the brackets 8a, 8b and 8c of the linking ends of the drive end unit (A), the intermediate units (C), and the idler end unit (B), in a conventional detachable manner such as by means of bolts and nuts. As a result, the rail means of each stage, including the outer and the inner rails 6a, 6b, 6c, 7a, 7b and 7c, and the guide channels 9a, 9b and 9c meet at the same levels to form a continuous track for each stage.

Each stage includes an endless traction chain 20, which comprises a plurality of elongated link elements or strips 20a pivotally connected end-to-end with one another by a plurality of vertical link pins 21 so as to form an endless articulated loop. The resulting endless traction chain 20 is extended between the drive sprocket 14 and the idler sprocket 19. The length of each link strip 20a is such that the length of the guide channels 9c of each intermediate unit (C) may be an integral multiple of the length of the link strip 20a. Each link pin 21 is equipped with a roller 22 on its bottom, as shown in FIGS. 3 and 4, which is adapted to rotatably engage with the guide channels 9a, 9b and 9c, and also to fit snugly in depressions formed in the peripheries of the drive and the idler sprockets 14 and 19, respectively. Thus, each traction chain 20 is removably mounted to be moved along the continuous track of one of the stages of the rotatable stock closet.

As shown in FIGS. 3-5, illustrating the container means of the invention, a plurality of container supports 23, each supporting a container 24 for the storage of the articles, are connected to link pins 21 of the traction chain 20 on their lower ends at a certain interval in the normal manner known to those skilled in the art. Each container support 23 is provided with two outer and two inner wheels 25 in the outer and the inner sides so as to move on and along the outer and the inner rails 6a, 6b, 6c, 7a, 7b and 7c. Each traction chain 20 and the attached container supports 23 and containers 24 function together as a removable unit.

5. Operation

In the embodiment described above, of course, each driver or motor 16 can be selectively operated independently from the others. With the construction of the stock closet described above, when a motor 16 is selectively operated, the drive sprocket 14 operatively connected to this motor 16 is driven in rotation together with the idler sprocket 19 corresponding thereto, thus causing the endless traction chain 20 stretched between these two sprockets to move along the guide channels 9a, 9b and 9c. Hence, as shown in FIGS. 3-5, the plurality of containers 24 connected to the traction chain 20 are driven in succession in such a manner that along the straight sections of the outer and the inner rails 6a, 6b, 6c, 7a, 7b and 7c mounted on the frame structures, the containers 24 on the container supports 23 may travel in straight lines. At the curved or half-circular sections of the outer rails 6a, 6b, where there is no inner rail, containers 24 may travel in curvilinear motion on and along the circumference of the drive and the idler sprockets 14 and 19 with their inner edges being supported generally on the circumferential areas of the sprockets 14 and 19.

Therefore, the operator may advantageously reach the desired article stocked in one container 24 of a specific stage by controlling the automatic movement of this particular container 24 to a predetermined handling point by the shortest possible route. The operator may use an electronic control unit (not shown) to selectively perate the desired electric motor 16 belonging to the stage where the desired container is located. The operator may selectively turn the motor on or off and may select the rotating direction of the motor.

6. Tension Adjustment

FIGS. 6-9 show tension adjusting means for the traction chain 20 of each stage which makes an adjustment by moving the first vertical shaft 12 and the drive motor 16 according to the present invention.

Figure 8:
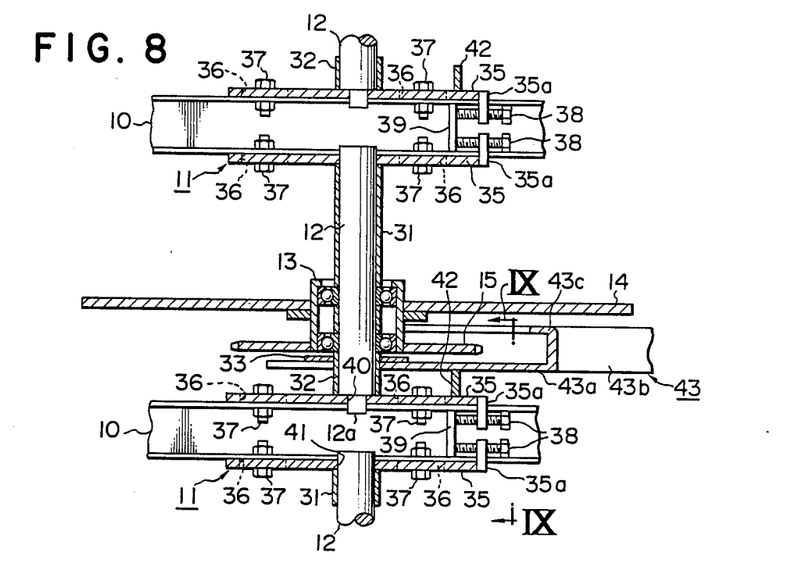
FIG. 8 is a longitudinal cross-sectional view of the invention, taken along line VIII—VIII of FIG. 6.
Figure 9:
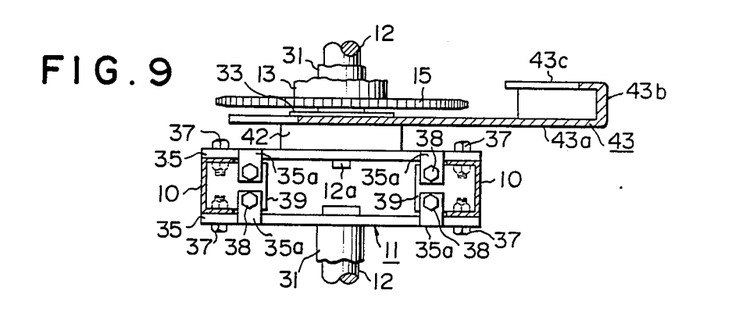
FIG. 9 is a longitudinal cross-sectional view of the invention, taken along the line IX—IX of FIG. 8.

In FIGS. 8 and 9, a pair of collars 31 and 32 are fitted on each first vertical shaft 12 adjacent to the upper and the lower portions of the bearing means 13, respectively, and in contact therewith. A flange 33 is attached to the upper part of the collar 32. The support means 11 for supporting the first vertical shafts 12 includes a pair of upper and lower support plates 35 mounted against the upper and lower surfaces of each pair of support beams 10. The support plates 35 each have a rectangular shape with pairs of long slots 36 extending in the longitudinal direction of support beams 10. Support plates 35 are adjustable in the longitudinal direction of the support beams 20 by loosening bolts 37 which are inserted in the long slots 36, and which mount the support plates 35 to support beams 10.

A pair of vertical pieces 35a are secured to the rightward or outer end of each of the upper and the lower support plates 35, and extend downwards and upwards therefrom, respectively, a certain length. A tension adjusting bolt 38 is screwed into a female screw tapped in each vertical piece 35a in a direction parallel to support beams 10. The movement of each tension adjusting bolt 38 is stopped by a stopper 39 which projects inside from the support beam 10 perpendicular thereto and receives the free end of the tension adjusting bolt 38.

The upper and the lower support plates 35 are provided with engage holes 40 and 41, respectively, at their centers. At the lower end of each verical shaft 12, an engage shaft 12a is formed, coaxial with vertical shaft 12 but with a reduced diameter, and engage shaft 12a fits into engage hole 40. The top of each vertical shaft 12 fits into engage hole 41. Hence, each vertical shaft 12 is supported by and between the lower support plate 35 of the support means 11 above it and the upper support plate 35 of the support means 11 below it. Each upper support plate 35 is provided with a support piece 42 projecting upwards a certain length from its rightward or outer end portion.

The tension of the traction chain 20 is adjusted by loosening bolts 37 and then screwing the tension adjusting bolts 38 frontwards or rearwards, thereby moving the drive sprocket 14 together with the first vertical shaft 12 and the support plates 35 to the proper position. Then, the loosened bolts 37 are one again tightened to the support plates 35.

Figure 6:
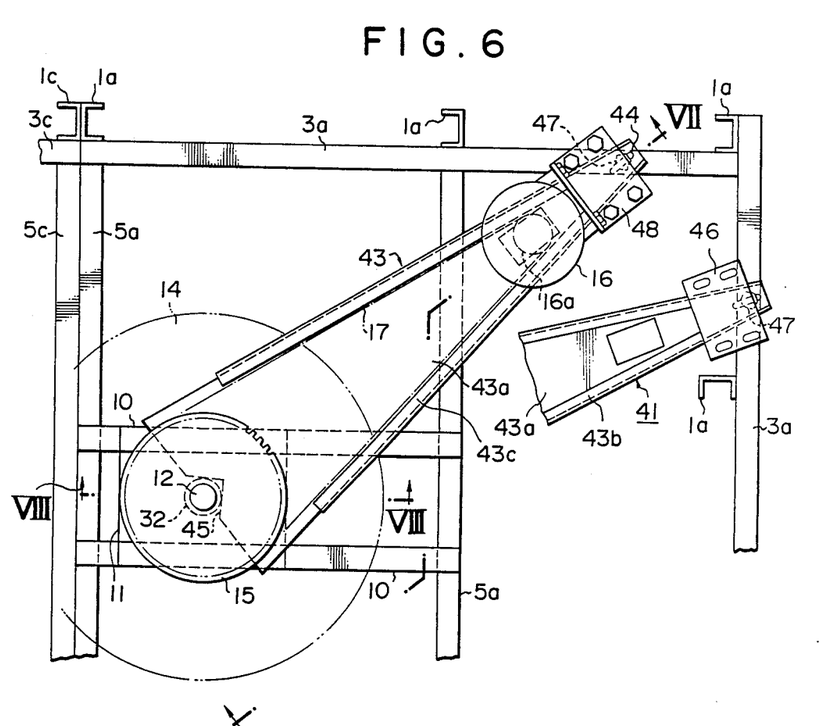
FIG. 6 is an enlarged fragmentary elevation of the drive portion of the rotatable stock closet shown in FIG. 1.
Figure 7:
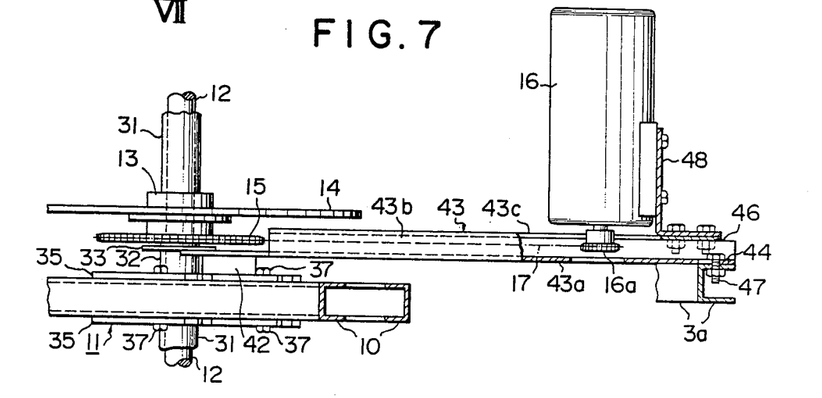
FIG. 7 is a longitudinal cross-sectional view of the invention, taken along line VII—VII of FIG. 6.

Each motor 16 is mounted to the outer bridge beam 3a of the drive end unit (A) via a motor mount 43 which also function as a cover of the endless chain 17, as clearly shown in FIGS. 6 and 7.

The motor mount 43 comprises a fan-shaped long base plate 43a having a long slot 44 in its outer free end extending in the longitudinal direction of base plate 43a, and a triangular cutout 45 in the center of its inner or base end. A pair of long side plates 43b extend upwards a short distance from both the sides of the base plate 43a except near the base end. A pair of long pieces 43c extend horizontally inwards a short length from the top ends of the side plates 43b except near their free ends.

A mount 46 is horizontally secured to and extends over the upper free end portions of the side plates 43b. A motor mount plate 48 having an L-shaped vertical cross-section is mounted to the mount 46 and is adjustable in the direction of the longitudinal length of the motor mount 43 by bolts and nuts in a conventional manner. The motor 16 is vertically mounted to the vertical secton of the motor mount plate 48 by bolts.

The motor mount 43 is fixed to the outer bridge beam 3a by mounting the free end of the base plate 43a by means of a mount bolt 47 which is inserted into the long slot 44 of the base plate 43a and a hole formed in the outer bridge beam 3a. The base part of the motor mount 43 is positioned in the space between the flange 33 of the collar 32 and the support piece 42 in contact therewith, and the triangular cutout 45 butts against or contacts the side of the collar 32.

When the axial position of the first vertical shaft 12 is adjusted in order to compensate for slack in the traction chain 20 due to wear in the elongated link strips 20a, bolt 47 is loosened. Then the extension of the traction chain 20 is adjusted by moving the first vertical shaft 12 together with the drive sprocket 14, as described above. At the same time, the motor mount 43 is moved rightward while the triangular cutout 45 of the base plate 43a of the motor mount 43 remains butting against or in contact with the side of the collar 32. The positions of the motor 16 and other elements are not adjusted, i.e. the distance between the motor 16 and the first vertical shaft 12 is kept at the predetermined length. Then, the bolts 37 and 47 are tightened again.

Accordingly, the tension forces applied to the chains 17 are received only by the motor mounts 43 when the motors are driven, and thus the frame construction including the struts 1a and the outer bridge beams 3a is not distorted by the tension forces. Further, the motor mounts 43 cover the chains 17, as clearly shown in FIGS. 6 and 7.

Although the present invention has been described in some detail by way of illustration and example for purposes of clarity of understanding, it will, of course, be understood that various changes and modifications thereof may be made in the form, details and arrangements of the parts without departing from the scope of the present invention.

What is claimed is:

1. A rotatable stock closet comprising a frame and a plurality of container conveying units arranged vertically one above another on the frame, each conveying unit comprising:
   first and second vertical shafts on the frame and spaced apart from each other;
   first and second rotatable members on the first and the second vertical shafts, respectively;
   a traction means on the first and second rotatable members, the traction means extending between and being adapted to be moved between the first and second rotatable members;
   a plurality of container means for containing stock items, each connected to the traction means;
   the first vertical shaft being movable in a direction away from the second vertical shaft for adjusting the distance between the first and the second vertical shafts to absorb slack in the traction means;
   means for rotating the first rotatable member for driving the traction means, comprising:
   a driving means mount having a free end and a base end, the free end being adjustably mounted to the frame, the base end rotatably contacting the first vertical shaft;
   a drive on the driving means mount; and connecting means for connecting the first rotatable member and the driver for rotating the first rotatable member; the driving means mount being for holding the driver at a predetermined distance from the first vertical shaft and for receiving forces caused by the driver.

2. The rotatable stock closet of claim 1, wherein each container conveying unit further comprises a respective rail means on the frame for providing a continuous track around the first and second vertical shafts, the traction means and the plurality of container means of each container conveying unit being movable along the respective rail means.

3. The rotatable stock closet of claim 1, wherein the connecting means of each container conveying unit comprises a third rotatable member connected for rotating the first rotatable member, a fourth rotatable member for being rotated by the driver; and an endless loop means for extending around the third and fourth rotatable members for rotating the third rotatable member when the fourth rotatable member is rotated.

4. The rotatable stock closet of claim 3, wherein the driving means mount of each container conveying unit comprises a base plate with edges adjacent to the endless loop means of the connecting means and cover pieces mounted at the edges of the base plate for covering the endless loop means.

5. The rotatable stock closet of claim 1 in which each driving means mount further has a triangular cutout in its base end for contacting the respective first vertical shaft.

6. A rotatable stock closet comprising:
   (A) a drive end unit comprising:
      (1) a drive end frame;

(2) a plurality of rail means mounted in a vertical stack to the drive end frame for providing a continuous track through the drive end frame; and (3) drive means mounted in the drive end frame for driving traction means;

(b) an intermediate unit series having a first end detachably connected to the drive end unit and a second end opposite the first end, the intermediate unit series comprising at least one intermediate unit, each intermediate unit comprising:

(1) an intermediate frame; and (2) a plurality of rail means mounted in a vertical stack to the intermediate frame for providing a continuous track through the intermediate frame; the intermediate units being detachably connected to each other to form the intermediate unit series;

(C) an idler end unit comprising:

(1) an idler end frame detachably connected to the intermediate unit series at the second end; and (2) a plurality of rail means mounted in a vertical stack to the idler end frame for providing a continuous track through the idler end frame; the plurality of rail means mounted to each drive end unit, idler end unit and intermediate unit all being aligned with the plurality of rail means mounted to each detachably connected drive end unit, idler end unit or intermediate unit to define a vertically stacked plurality of continuous tracks; and (D) a plurality of removable units, each comprising:

(1) traction means removably mounted on the rail means for moving along a respective one of the plurality of continuous tracks; the traction means being driven by the drive means; and (2) a plurality of container means for containing stock items, each container means being connected to the traction means for moving therewith;

the drive means of the drive end unit comprising: a plurality of drivers, each mounted for support by the drive end frame; a plurality of connecting means, each connecting a respective driver for driving a respective one of the traction means; and a plurality of third rotatable members, each connected for driving a respective one of the traction means;

each driver comprising a respective fourth rotatable member for being rotated by the driver; each connecting means comprising an endless loop means for extending around respective ones of the third and fourth rotatable members for rotating the respective third rotatable member when the respective fourth rotatable member is rotated;

the drive means further comprising a plurality of vertical shafts, each for supporting a respective one of the third rotatable members, the drive means further comprising a plurality of driving means mounts, each having a base end rotatably contacting a respective one of the vertical shafts and a free end adjustable mounted to the drive end frame, a respective one of the drivers being mounted to each driving means mount near the free end for being supported by the drive end frame, each mount thereby holding the respective driver at a predetermined distance from the respective vertical shaft.

7. The rotatable stock closet of claim 6 in which each driving means mount further has a triangular cutout in its base end for contacting the respective vertical shaft.

8. The rotatable stock closet of claim 6 in which each driving means mount comprises a base plate with edges adjacent to the endless loop means of the respective connecting means and cover pieces mounted at the edges of the base plate for covering the endless loop means.

9. A rotatable stock closet comprising:

(A) a drive end unit comprising:

(1) a drive end frame:

(2) a plurality of rail means mounted in a vertical stack to the drive end frame for providing a continuous track through the drive end frame; and (3) drive means mounted in the drive end frame for driving traction means;

(B) an intermediate unit series having a first end detachably connected to the drive end unit and a second end opposite the first end, the intermediate unit series comprising at least one intermediate unit, each intermediate unit comprising:

(1) an intermediate frame; and (2) a plurality of rail means mounted in a vertical stack to the intermediate frame for providing a continuous track through the intermediate frame; the intermediate units being detachably connected to each other to form the intermediate unit series;

(C) an idler end unit comprising:

(1) an idler end frame detachably connected to the intermediate unit series at the second end; and (2) a plurality of rail means mounted in a vertical stack to the idler end frame for providing a continuous track through the idler end frame; the plurality of rail means mounted to each drive end unit, idler end unit and intermediate unit all being aligned with the plurality of rail means mounted to each detachably connected drive end unit, idler end unit or intermediate unit to define a vertically stacked plurality of continuous tracks; and (D) a plurality of removable units, each comprising:

(1) traction means removably mounted on the rail means for moving along a respective one of the plurality of continuous tracks; the traction means being driven by the drive means; and (2) a plurality of continuous means for containing stock items, each containers means being connected to the traction means for moving therewith;

each drive end unit further comprising a plurality of first support means each first support means being mounted in the drive end frame inside a respective continuous track and comprising a first rotatable member;

each idler end unit further comprising a plurality of second support means, each second support means being mounted in the idler end frame inside a respective continuous track and comprising a second rotatable member; the traction means of each removable unit extending around respective first and second rotatable members;

the drive means comprising a plurality of drivers, each mounted for support by the drive end frame; a plurality of connecting means, each connecting a respective driver for rotating the respective first rotatable member; and a plurality of third rotatable members connected for rotating the respective first rotatable members;

each driver comprising a respective fourth rotatable member for drivably rotating; each connecting means comprising an endless loop means for extending around respective ones of the third and fourth rotatable members for rotating the respective third rotatable member when the respective fourth rotatable member is rotated;

the drive means further comprising a plurality of driving means mounts, each having a base end rotatably contacting the vertical shaft of a respective one of the first support means and a free end adjustably mounted to the drive end frame, a respective one of the drivers being mounted to each driving means mount near the free end for being supported by the drive end frame, each mount thereby holding the respective driver at a predetermined distance from the vertical shaft of the respective first support means.

10. The rotatable stock closet of claim 9 in which each driving means mount further has a triangular cutout in its base end for contacting the vertical shaft of the respective first support means.

11. The rotatable stock closet of claim 9 in which each driving means mount comprises a base plate with edges adjacent to the endless loop means of the respective connecting means and cover pieces mounted at the edges of the base plate for covering the endless loop means.

* * * * *